United States Patent
Yamanaka et al.

(10) Patent No.: US 9,695,061 B2
(45) Date of Patent: Jul. 4, 2017

(54) METHOD FOR PRODUCING BARIUM TITANATE POWDER

(71) Applicant: SAKAI CHEMICAL INDUSTRY CO., LTD., Sakai-shi, Osaka (JP)

(72) Inventors: Kazumi Yamanaka, Sakai (JP); Yuji Baba, Sakai (JP); Minoru Yoneda, Sakai (JP); Yukihiro Kuniyoshi, Iwaki (JP); Shinji Ogama, Sakai (JP)

(73) Assignee: SAKAI CHEMICAL INDUSTRY CO., LTD., Osaka (JP)

(*) Notice: Subject to any disclaimer, the term of this patent is extended or adjusted under 35 U.S.C. 154(b) by 0 days.

(21) Appl. No.: 14/912,732

(22) PCT Filed: Aug. 22, 2014

(86) PCT No.: PCT/JP2014/071959
§ 371 (c)(1),
(2) Date: Feb. 18, 2016

(87) PCT Pub. No.: WO2015/025939
PCT Pub. Date: Feb. 26, 2015

(65) Prior Publication Data
US 2016/0200588 A1 Jul. 14, 2016

(30) Foreign Application Priority Data

Aug. 23, 2013 (JP) ................ 2013-173080

(51) Int. Cl.
*C01G 23/00* (2006.01)
*H01G 4/12* (2006.01)
(Continued)

(52) U.S. Cl.
CPC ........ *C01G 23/006* (2013.01); *C04B 35/4682* (2013.01); *H01G 4/12* (2013.01);
(Continued)

(58) Field of Classification Search
CPC ...... C01G 23/006; H01G 4/12; H01G 4/1227; H01G 4/30; C04B 35/4682;
(Continued)

(56) References Cited

U.S. PATENT DOCUMENTS

2004/0028601 A1* 2/2004 Torii .................. B82Y 30/00
423/598
2008/0131355 A1 6/2008 Auer et al.

FOREIGN PATENT DOCUMENTS

JP H05-139744 A 6/1993
JP 2002-211926 A 7/2002
(Continued)

OTHER PUBLICATIONS

Pottier, A. et al., "Size tailoring of TiO$_2$ anatase nanoparticles in aqueous medium and sythesis of nanocomposites. Characterization by Raman spectroscopy", J. Mater. Chem., Feb. 11, 2003, vol. 13, No. 4, pp. 877-882, DOI: 10.1039/b21127Ij.
Park, J.H. et al., "Synthesis of Barium Titanate by Hydrothermal Method and Its Formation of Mechanisms", Journal of Chemical Engineering of Japan, Jul. 20, 2008, vol. 41, No. 7, pp. 631-638, DOI;10.1252/jcej.
International Search Report and Written Opinion, Nov. 25, 2014; PCT/JP2014/071959 (12 pages).

*Primary Examiner* — Anthony J Zimmer
(74) *Attorney, Agent, or Firm* — Hamre, Schuman, Mueller & Larson, P.C.

(57) ABSTRACT

The invention provides a method for producing barium titanate powder comprising the steps of: adding an aqueous slurry of anatase hydrous titanium oxide having a BET specific surface area in the range of 200 to 400 m$^2$/g and a half width of diffraction peak of (101) plane in the range of 2.3° to 5.0° as measured by X-ray diffraction to an aqueous solution of barium hydroxide while maintaining the aqueous solution of barium hydroxide at a temperature in the range from 80° C. to the boiling point thereof under normal pressure to cause a reaction of the barium hydroxide with the hydrous titanium oxide to provide an aqueous slurry of barium titanate precursor; and subjecting the barium titanate precursor thus obtained to hydrothermal treatment over a period of time shorter than 24 hours to provide barium titanate particles.

4 Claims, 1 Drawing Sheet

(51) Int. Cl.
  *C04B 35/468* (2006.01)
  *H01G 4/30* (2006.01)
(52) U.S. Cl.
  CPC ....... *H01G 4/1227* (2013.01); *C01P 2002/04* (2013.01); *C01P 2006/12* (2013.01); *C04B 2235/444* (2013.01); *C04B 2235/5409* (2013.01); *C04B 2235/652* (2013.01); *C04B 2235/6562* (2013.01); *C04B 2235/6582* (2013.01); *H01G 4/30* (2013.01)
(58) Field of Classification Search
  CPC ...... C04B 2235/5409; C04B 2235/652; C04B 2235/6562; C04B 2235/6582; C04B 2235/444; C01P 2002/04; C01P 2006/12
  See application file for complete search history.

(56) References Cited

FOREIGN PATENT DOCUMENTS

| | | |
|---|---|---|
| JP | 2006-27971 A | 2/2006 |
| JP | 2008-513324 A | 5/2008 |
| JP | 2009-29645 A | 2/2009 |
| JP | 2012-62229 A | 3/2012 |
| WO | 2012/108472 A | 8/2012 |

\* cited by examiner

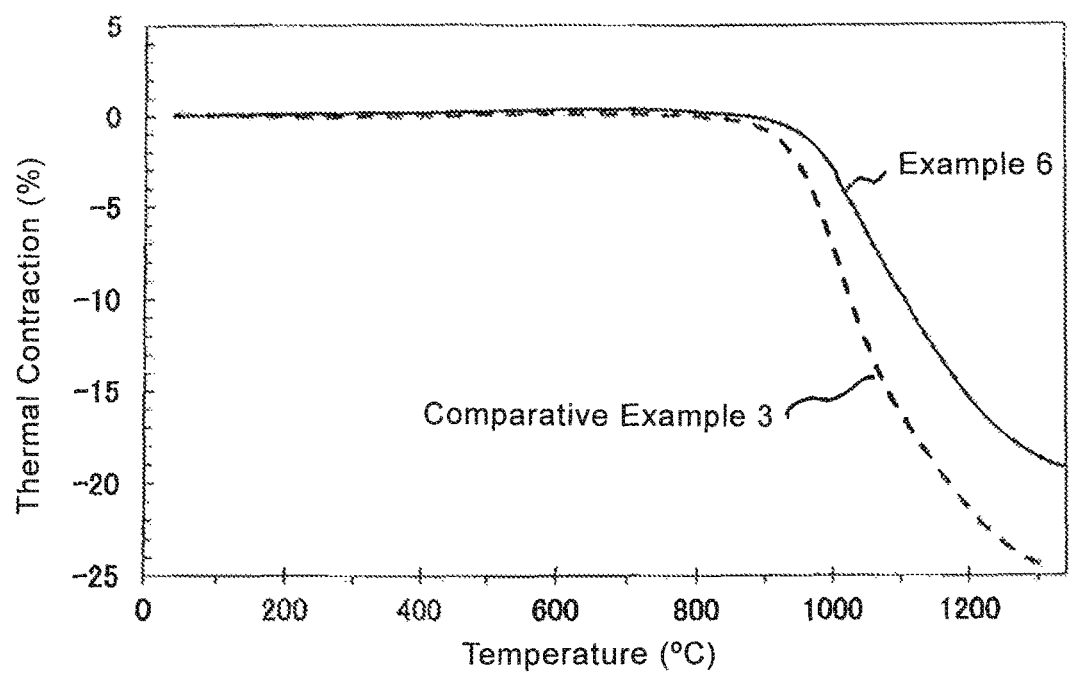

METHOD FOR PRODUCING BARIUM TITANATE POWDER

TECHNICAL FIELD

The present invention relates to a method for producing barium titanate powder, more specifically to a method for producing barium titanate powder which is comprised of uniform fine particles superior in crystallinity, and is therefore improved in thermal contract characteristics.

BACKGROUND ART

In recent years, a substantial improvement of the properties of elements configuring the electronic devices and the starting materials for manufacturing the electronic devices has been strongly demanded with a reduction in size, an enhancement of performance, and a reduction in weight of various electronic devices.

For example, a multilayer ceramic capacitor (MLCC) has been increasingly strongly demanded to reduce the layer thickness. Therefore, barium titanate for use in manufacturing of the MLCC has been increasingly demanded to be uniform particles and to have high crystallinity and to be superior in dispersibility, for example.

Heretofore, as a method for producing barium titanate, a solid phase method, an oxalic acid method, a sol-gel method, and the like are known. However, in order to produce barium titanate fine particles, particularly those having a particle diameter of about 150 nm or less, for satisfying the recent demand for the reduction in layer thickness of the MLCC, a hydrothermal process which is a wet process is advantageous. Since the solid phase method and the oxalic acid method include a calcination process, uniform particles are difficult to obtain, and moreover the resulting particles are easy to aggregate so that fine particles are difficult to obtain. The sol-gel method employs an expensive alkoxide as the raw material, and therefore the sol-gel method has a problem in the production cost.

Various methods for producing barium titanate by the hydrothermal process are heretofore already known. By way of example, a method is mentioned in which an aqueous solution of barium salt is added to and reacted with a slurry of hydrous titanium oxide in the presence of a carboxylic acid to produce barium titanate core particles, the slurry containing the barium titanate core particles thus obtained is subjected to hydrothermal treatment to obtain spherical barium titanate particles, and then the obtained spherical barium titanate particles are fired at a temperature of 800 to 1200° C. (Patent Literature 1).

According to this method, barium titanate fine particles having a relatively large BET specific surface area can be obtained, but the particles are not satisfactory in crystallinity. Therefore, the temperature at which thermal contract starts when firing and sintering barium titanate is not necessarily high. This poses a problem that, when used as a common material for an internal electrode, for example, cracking occurs in firing in the manufacturing of the MLCC.

CITATION LIST

Patent Literature

Patent Literature 1: JP 2002-211926A

SUMMARY OF INVENTION

Technical Problem

The invention has been completed in order to solve the above-mentioned problems in the production of barium titanate powder. It is an object of the present invention to provide a method for producing barium titanate powder which is comprised of uniform fine particles superior in crystallinity, and is therefore improved in thermal contract characteristics.

Solution to Problem

The invention provides a method for producing barium titanate powder comprising the steps of:

adding an aqueous slurry of anatase hydrous titanium oxide having a BET specific surface area in the range of 200 to 400 m$^2$/g and a half width of diffraction peak of (101) plane in the range of 2.3° to 5.0° as measured by X-ray diffraction to an aqueous solution of barium hydroxide while maintaining the aqueous solution of barium hydroxide at a temperature in the range from 80° C. to the boiling point thereof under normal pressure to cause a reaction of the barium hydroxide with the hydrous titanium oxide to provide an aqueous slurry of barium titanate precursor; and subjecting the barium titanate precursor thus obtained to hydrothermal treatment over a period of time shorter than 24 hours to provide barium titanate particles.

A particularly preferable method for producing barium titanate powder according to the invention comprises the steps of:

adding an aqueous solution of titanium tetrachloride and an aqueous solution of an alkali at the same time to water maintained at a temperature of 45 to 65° C. while maintaining the temperature of the resulting reaction mixture in the range of 45 to 65° C. and maintaining the pH thereof in the range of 1.5 to 3.5 to simultaneously neutralize the titanium tetrachloride with the alkali thereby to provide an aqueous slurry of anatase hydrous titanium oxide having a BET specific surface area in the range of 200 to 400 m$^2$/g and a half width of diffraction peak of (101) plane in the range of 2.3° to 5.0° as measured by X-ray diffraction;

adding the aqueous slurry of anatase type hydrous titanium oxide to an aqueous solution of barium hydroxide while maintaining the aqueous solution of barium hydroxide at a temperature in the range from 80° C. to the boiling point thereof under normal pressure to cause a reaction of the barium hydroxide with the hydrous titanium oxide to provide an aqueous slurry of barium titanate precursor; and subjecting the barium titanate precursor thus obtained to hydrothermal treatment over a period of time shorter than 24 hours to provide barium titanate particles.

According to the present invention, it is preferred that the barium titanate precursor is subjected to the hydrothermal treatment at a temperature of 250° C. or less.

Advantageous Effects of Invention

According to the method of the invention, there is obtained barium titanate powder which is comprised of uniform fine particles superior in crystallinity, and is therefore improved in thermal contract characteristics.

BRIEF DESCRIPTION OF DRAWINGS

FIG. 1 is a graph showing the thermal contract behavior of barium titanate obtained by the method of the invention together with the thermal contract behavior of barium titanate obtained in a Comparative Example.

DESCRIPTION OF EMBODIMENTS

The method for producing barium titanate powder of the invention comprises the steps of:

adding an aqueous slurry of anatase hydrous titanium oxide having a BET specific surface area in the range of 200 to 400 ms/g and a half width of diffraction peak of (101) plane in the range of 2.3° to 5.0° as measured by X-ray diffraction to an aqueous solution of barium hydroxide while maintaining the aqueous solution of barium hydroxide at a temperature in the range from 80° C. to the boiling point thereof under normal pressure to cause a reaction of the barium hydroxide with the hydrous titanium oxide to provide an aqueous slurry of barium titanate precursor; and subjecting the barium titanate precursor thus obtained to hydrothermal treatment over a period of time shorter than 24 hours to provide barium titanate particles.

When the BET specific surface area of the anatase hydrous titanium oxide used is larger than 400 m$^2$/g, the resulting barium titanate is inferior in crystallinity. When the BET specific surface area of the anatase hydrous titanium oxide used is smaller than 200 m$^2$/g, the anatase hydrous titanium oxide has a high crystallinity, but on the other hand, it has a poor reactivity with barium hydroxide with the consequence that the barium titanate particles obtained are inferior in crystallinity.

In particular, according to the invention, the anatase hydrous titanium oxide used has a BET specific surface area preferably in the range of 200 to 350 m$^2$/g, and more preferably in the range of 220 to 330 m$^2$/g.

Further, when the anatase hydrous titanium oxide used has a half width of diffraction peak of (101) plane smaller than 2.3° as measured by X-ray diffraction, it has a high crystallinity, but has a poor reactivity with barium hydroxide, and therefore the resulting barium titanate particles are low in crystallinity. On the other hand, when the anatase hydrous titanium oxide used has a half width larger than 5.0°, the resulting barium titanate particles are low in crystallinity.

In particular, the anatase hydrous titanium oxide used has a half width of diffraction peak of (101) plane preferably in the range of 2.3° to 4.0° as measured by X-ray diffraction, and more preferably in the range of 2.3° to 3.5°.

As described above, the aqueous slurry of anatase hydrous titanium oxide having a BET specific surface area in the range of 200 to 400 m$^2$/g and a half width of diffraction peak of (101) plane in the range of 2.3° to 5.0° as measured by X-ray diffraction is obtained preferably by adding an aqueous solution of titanium tetrachloride and an aqueous solution of an alkali each having a temperature maintained in the range of 45 to 65° C. at the same time to water maintained at a temperature of 45 to 65° C. beforehand to simultaneously neutralize the titanium tetrachloride with the alkali while maintaining the pH of the resulting reaction mixture in the range of 1.5 to 3.5, preferably in the range of 2.0 to 3.5.

Therefore, according to the invention, the most preferred method for producing barium titanate powder comprises the steps of:

adding an aqueous solution of titanium tetrachloride and an aqueous solution of an alkali at the same time to water maintained at a temperature of 45 to 65° C. while maintaining the temperature of the resulting reaction mixture in the range of 45 to 65° C. and maintaining the pH thereof in the range of 1.5 to 3.5 to simultaneously neutralize the titanium tetrachloride with the alkali thereby to provide an aqueous slurry of anatase hydrous titanium oxide having a BET specific surface area in the range of 200 to 400 m$^2$/g and a half width of diffraction peak of (101) plane in the range of 2.3° to 5.0° as measured by X-ray diffraction;

adding the aqueous slurry of anatase hydrous titanium oxide thus obtained to an aqueous solution of barium hydroxide while maintaining the aqueous solution of barium hydroxide at a temperature in the range from 80° C. to the boiling point thereof under normal pressure to cause a reaction of the barium hydroxide with the hydrous titanium oxide to provide an aqueous slurry of barium titanate precursor; and subjecting the barium titanate precursor thus obtained to hydrothermal treatment over a period of time shorter than 24 hours to provide barium titanate particles.

According to the invention, as described above, the aqueous slurry of anatase type hydrous titanium oxide is obtained preferably by simultaneously neutralizing titanium tetrachloride with an alkali. Herein, the simultaneous neutralization of the titanium tetrachloride with the alkali refers to simultaneously adding an aqueous solution of titanium tetrachloride and an aqueous solution of alkali into a container containing water and mixing them in the container to neutralize the titanium tetrachloride with the alkali.

In the simultaneous neutralization of the titanium tetrachloride with the alkali described above, the concentration of the hydrous titanium oxide in the slurry when the simultaneous neutralization has been completed is not particularly limited, and it is usually preferred that it is in the range of 10 to 50 g/L in terms of TiO$_2$. In case that the concentration of the hydrous titanium oxide in the slurry is higher than 50 g/L in terms of TiO$_2$ when the simultaneous neutralization has been completed, amorphous hydrous titanium oxide is likely to generate, and therefore it becomes difficult to obtain anatase hydrous titanium oxide. On the other hand, in case that the concentration of the hydrous titanium oxide in the slurry is lower than 10 g/L in terms of TiO$_2$ when the simultaneous neutralization has been completed, the productivity is likely to be poor.

Further, in the simultaneous neutralization of the titanium tetrachloride with the alkali described above, the temperatures of water, the aqueous solution of titanium tetrachloride, and the aqueous solution of the alkali do not need to be all the same, but the temperatures are preferably close to each other, most preferably all the same, in particular.

As the aqueous solution of the alkali solution, an aqueous solution of an alkali metal hydroxide such as sodium hydroxide and potassium hydroxide, ammonia, and the like are preferably used. In place of the aqueous solution of alkali, a solid alkali compound may be directly added.

Even if the pH of the resulting reaction mixture is in the range of 1.5 to 3.5 in the simultaneous neutralization of the titanium tetrachloride with the alkali described above, when the neutralization temperature is lower than 45° C., the anatase hydrous titanium oxide cannot be obtained, and the BET specific surface area of the resulting hydrous titanium oxide exceeds 400 m$^2$/g.

When the neutralization temperature is higher than 65° C., the titanium tetrachloride is hydrolyzed, and rutile hydrous titanium oxide is likely to generate or the half width of the hydrous titanium oxide becomes smaller than 2.3°. The rutile hydrous titanium oxide has a poor reactivity with barium hydroxide and the barium titanate particles obtained are inferior in crystallinity. Also when the half width of the hydrous titanium oxide is smaller than 2.3°, the barium titanate particles obtained are inferior in crystallinity.

On the other hand, even if the neutralization temperature is in the range of 45 to 65° C., when the pH of the resulting reaction mixture is higher than 3.5, the anatase hydrous titanium oxide cannot be obtained and the BET specific surface area of the resulting hydrous titanium oxide exceeds 400 m$^2$/g. When using such hydrous titanium oxide, the barium titanate particles obtained are inferior in crystallinity.

When the pH of the resulting reaction mixture is lower than 1.5, a large number of chloride ions remain as impurities in the hydrous titanium oxide produced, and as a result, the reactivity thereof with barium hydroxide deteriorates and thus the barium titanate particles obtained are inferior in crystallinity.

Thus, according to the invention, titanium tetrachloride is simultaneously neutralized with the alkali in water to provide hydrous titanium oxide, the resulting slurry is filtered and washed with water to remove therefrom the chloride ions and the like generated in the neutralization, and the resulting cake is dispersed in water, thereby the aqueous slurry of hydrous titanium oxide is obtained which can be preferably used in the step of obtaining an aqueous slurry of the barium titanate precursor.

The aqueous slurry of anatase hydrous titanium oxide having a BET specific surface area in the range of 200 to 400 m$^2$/g and a half width of diffraction peak of (101) plane in the range of 2.3° to 5.0° as measured by X-ray diffraction is added to an aqueous solution of barium hydroxide while maintaining the aqueous solution of barium hydroxide at a temperature in the range from 80° C. to the boiling point thereof under normal pressure to cause a reaction of the barium hydroxide with the hydrous titanium oxide as described above to provide an aqueous slurry of barium titanate precursor.

The barium titanate precursor obtained by the reaction of the barium hydroxide with the hydrous titanium oxide is usually comprised of fine particles of barium titanate having a BET specific surface area in the range of 50 to 200 m$^2$/g. Since the reaction between the barium hydroxide and the hydrous titanium oxide is a reaction under normal pressure, the barium titanate precursor obtained has a Ba/Ti ratio smaller than 1, but it has been confirmed by powder X-ray diffraction that the barium titanate precursor obtained has a crystal structure of barium titanate.

In the aqueous solution of barium hydroxide, the solvent may contain a water-soluble organic solvent insofar as the reaction of the barium hydroxide with the hydrous titanium oxide is not adversely affected. As such a water-soluble organic solvent, ethylene glycol, diethylene glycol, polyethylene glycol, and the like can be mentioned, for example.

When obtaining the barium titanate precursor by the reaction of the barium hydroxide with the hydrous titanium oxide, it is preferred that the barium hydroxide and the hydrous titanium oxide are used in such a manner that the Ba/Ti molar ratio is in the range of 1.1 to 3.0 when the addition of the aqueous slurry of anatase hydrous titanium oxide to the aqueous barium hydroxide solution has been completed. In the reaction of the barium hydroxide with the hydrous titanium oxide, when the Ba/Ti molar ratio is smaller than 1.1, the alkalinity of the resulting reaction system is low so that the reactivity between the barium hydroxide and the hydrous titanium oxide deteriorates. When the Ba/Ti molar ratio is higher than 3.0, the reactivity between the barium hydroxide and the hydrous titanium oxide has no problems; however, since the barium hydroxide which does not contribute to the reaction is excessively used, there is caused a problem that the production cost becomes high.

In the step of obtaining the aqueous slurry of the barium titanate precursor described above, the temperature at which the barium hydroxide is reacted with the hydrous titanium oxide is important. Even if the anatase hydrous titanium oxide has a BET specific surface area in the range of 200 to 400 m$^2$/g and a half width in the range of 2.3° to 5.0° as described above, when the temperature of the reaction thereof with the barium hydroxide is lower than 80° C. under normal pressure, barium titanate particles with a high crystallinity cannot be obtained. The upper limit of the reaction temperature is a temperature up to the boiling point of the reaction mixture containing the barium hydroxide.

According to the method of the invention, the barium titanate precursor obtained as described above is subjected to hydrothermal treatment over a period of time shorter than 24 hours, the resulting slurry is filtered, washed with water, and then dried, to provide the intended barium titanate powder comprised of uniform fine particles superior in crystallinity. If it is intended to synthesize barium titanate only by the hydrothermal treatment without passing through the barium titanate precursor, the reaction of the barium hydroxide with hydrous titanium oxide progresses simultaneously with the particle growth of the resulting barium titanate particles, and, as a result, a large number of hydroxyl groups are taken into the barium titanate particles, which makes it difficult to obtain barium titanate particles with a high crystallinity.

The aqueous slurry of the barium titanate precursor subjected to hydrothermal treatment preferably contains the barium titanate precursor in a concentration in the range of 0.4 to 1.0 mol/L in terms of BaTiO$_3$.

The aqueous slurry of the barium titanate precursor may be subjected to the hydrothermal treatment while maintaining the obtained concentration without condensing or diluting the same.

The aqueous slurry of the barium titanate precursor is put into an autoclave usually as it is, and is then subjected to the hydrothermal treatment at a temperature that exceeds the boiling point thereof under normal pressure and that is usually not more than 250° C., preferably in the range of 105 to 250° C. over a period of time shorter than 24 hours, preferably over 0.5 to 20 hours.

After the hydrothermal treatment, the content in the autoclave is cooled to normal temperature, the obtained slurry is filtered, washed with water, and then dried to obtain barium titanate powder. The drying temperature is usually in the range of 100 to 150° C.

The barium titanate powder thus obtained is comprised of uniform fine particles superior in crystallinity and usually has a BET specific surface area in the range of 10 to 70 m$^2$/g.

In the invention, the crystallinity of the barium titanate is evaluated on the basis of the ratio of the crystallite size to the particle diameter. The crystallite size can be determined from powder X-ray diffraction of the barium titanate powder. The particle diameter can be determined from the BET specific surface area of the barium titanate powder. The barium titanate powder obtained by the invention has a crystallinity in the meaning described above, i.e., the ratio of crystallite size/particle diameter, in the range of 0.90 to 1.10, and preferably in the range of 0.93 to 1.07. As the crystallinity is very close to 1.00, the barium titanate powder obtained by the invention has a superior crystallinity. Such a high crystallinity that the barium titanate obtained by the invention has means that the particle diameter of each particle in the obtained barium titanate powder is very close to the crystallite size and shows that each particle is close to a single crystal particle. Thus, in the present invention, the crystallinity in the meaning described above is referred to as single crystallinity.

As described above, the barium titanate particles obtained by the invention have a high single crystallinity, and therefore the thermal contract characteristics are remarkably improved. As a result, when the barium titanate powder obtained by the invention is molded and sintered, the temperature at which the thermal contract starts is higher than the heretofore known barium titanate powders. Therefore, the barium titanate powder obtained by the invention can be preferably used as a common material for internal electrode and a dielectric composition in the manufacturing of the MLCC.

The invention is described in detail with reference to Examples, but the present invention is not limited to Examples.

EXAMPLES

Example 1

Preparation of Aqueous Slurry of Hydrous Titanium Oxide 500 mL of pure water was put into a beaker and then warmed to 60° C. 350 mL of an aqueous solution of titanium tetrachloride (manufactured by Osaka Titanium Technologies Co., Ltd., 3.8 mol/L in terms of $TiO_2$) and 7 L of pure water were added at the same time to the water at a rate of 2.5 mL/minute and 50 mL/minute, respectively, while simultaneously an aqueous sodium hydroxide solution having a concentration of 30% by weight was also added to the water, and while maintaining the resulting mixture at a pH of 2.0 and at a temperature of 60° C., to simultaneously neutralize the titanium tetrachloride with the alkali, the sodium hydroxide, thereby an aqueous slurry of hydrous titanium oxide having a concentration of 14 g/L in terms of $TiO_2$ was obtained.

The aqueous slurry thus obtained was filtered and then washed with water to remove sodium ions and chloride ions therefrom. Pure water was added to the obtained cake to provide an aqueous slurry of anatase hydrous titanium oxide having a concentration of 110 g/L in terms of $TiO_2$.

(Preparation of Aqueous Slurry of Barium Titanate Precursor)

567 mL of pure water and 959 g of barium hydroxide octahydrate (manufactured by Sakai Chemical Industry Co., Ltd.) were put into a 5 L-capacity reaction vessel, and then heated to 100° C. to dissolve the barium hydroxide octahydrate in water to prepare an aqueous barium hydroxide solution.

The aqueous slurry of the hydrous titanium oxide was added while maintaining the temperature at 100° C. to the aqueous solution of barium hydroxide while maintaining the temperature at 100° C. in 1 hour, and they were reacted at a temperature of 100° C. for 2 hours, thereby an aqueous slurry of barium titanate precursor having a concentration of 0.66 mol/L in terms of $BaTiO_3$ was obtained. The Ba/Ti molar ratio in the resulting reaction mixture was 2.3 when the addition of the aqueous slurry of hydrous titanium oxide to the aqueous barium hydroxide solution was completed.

(Hydrothermal Treatment of Aqueous Slurry of Barium Titanate Precursor)

The aqueous slurry of the barium titanate precursor having a concentration of 0.66 mol/L in terms of $BaTiO_3$ obtained above was placed in an autoclave vessel, and then subjected to hydrothermal treatment at 190° C. for 0.5 hours. Then, the content in the autoclave was allowed to cool to room temperature. The obtained aqueous slurry was filtered, washed with water, and then dried at 130° C. to give barium titanate powder.

Example 2

Barium titanate powder was obtained in the same manner as in Example 1 except that the simultaneous neutralization of titanium tetrachloride was performed at a temperature of 50° C., and the hydrothermal treatment of aqueous slurry of barium titanate precursor was performed at 180° C. for 20 hours, and otherwise in the same manner as in Example 1.

Example 3

Barium titanate powder was obtained in the same manner as in Example 1 except that the simultaneous neutralization of titanium tetrachloride was performed at a temperature of 50° C., and the hydrothermal treatment of aqueous slurry of barium titanate precursor was performed at 205° C. for 2 hours, and otherwise in the same manner as in Example 1.

Example 4

Barium titanate powder was obtained in the same manner as in Example 1 except that the simultaneous neutralization of titanium tetrachloride was performed at a pH of 3.0, the reaction of hydrous titanium oxide with barium hydroxide was performed at a temperature of 100° C. for 5 hours, and the hydrothermal treatment of aqueous slurry of barium titanate precursor was performed at 130° C. for 0.5 hours, and otherwise in the same manner as in Example 1.

Example 5

Barium titanate powder was obtained in the same manner as in Example 1 except that the simultaneous neutralization of titanium tetrachloride was performed at a temperature of 50° C., the reaction of hydrous titanium oxide with barium hydroxide was performed at a temperature of 80° C. for 5 hours, and the hydrothermal treatment of aqueous slurry of barium titanate precursor was performed at 200° C. for 2 hours, and otherwise in the same manner as in Example 1.

Example 6

Barium titanate powder was obtained in the same manner as in Example 1 except that the simultaneous neutralization of titanium tetrachloride was performed at a pH of 3.0, the reaction of hydrous titanium oxide with barium hydroxide was performed at a temperature of 95° C. for 5 hours, and the hydrothermal treatment of aqueous slurry of barium titanate precursor was performed at 180° C. for 0.5 hours, and otherwise in the same manner as in Example 1.

The thermal contraction behavior of the barium titanate powder obtained above is shown in FIG. 1. The thermal contraction behavior was measured as follows. The barium titanate powder was molded into a disk-like product 5 mm in diameter and 3 mm in thickness under a pressure of 1 ton/cm$^2$ with a molding die. The molded product was heated from 25° C. to 1350° C. at a rate of 5° C. per minute using a thermomechanical analyzer (TMA8310 manufactured by Rigaku Corporation) while the thermal contraction was measured while it was heated. The measurement was performed under a reducing atmosphere wherein a mixed gas composed of 2% of hydrogen and the remainder nitrogen was circulated at a rate of 200 mL per minute.

Example 7

Barium titanate powder was obtained in the same manner as in Example 1 except that the simultaneous neutralization of titanium tetrachloride was performed at a temperature of 50° C., the reaction of hydrous titanium oxide with barium hydroxide was performed at a temperature of 100° C. for 2 hours, and the hydrothermal treatment of aqueous slurry of barium titanate precursor was performed at 110° C. for 2 hours, and otherwise in the same manner as in Example 1.

Example 8

Barium titanate powder was obtained in the same manner as in Example 1 except that the simultaneous neutralization of titanium tetrachloride was performed at a temperature of 45° C., and the hydrothermal treatment of aqueous slurry of barium titanate precursor was performed at 200° C. for 2 hours, and otherwise in the same manner as in Example 1.

Example 9

Barium titanate powder was obtained in the same manner as in Example 1 except that the simultaneous neutralization of titanium tetrachloride was performed at a temperature of 45° C., and the hydrothermal treatment of aqueous slurry of barium titanate precursor was performed at 180° C. for 20 hours, and otherwise in the same manner as in Example 1.

Example 10

Barium titanate powder was obtained in the same manner as in Example 1 except that the simultaneous neutralization of titanium tetrachloride was performed at a pH of 3.5 and at a temperature of 45° C., and the hydrothermal treatment of aqueous slurry of barium titanate precursor was performed at 200° C. for 2 hours, and otherwise in the same manner as in Example 1.

Comparative Example 1

Preparation of Aqueous Slurry of Hydrous Titanium Oxide 500 mL of pure water was put into a beaker, and was maintained at a temperature of 20° C. 350 mL of an aqueous solution of titanium tetrachloride (manufactured by Osaka Titanium Technologies Co., Ltd., 3.8 mol/L in terms of TiO$_2$) and 7 L of pure water were added at the same time to the water at a rate of 2.5 mL per minute and 50 mL per minute, respectively, while simultaneously an aqueous solution of sodium hydroxide having a concentration of 30% by weight was added to the water and while simultaneously the resulting mixture was adjusted at a pH of 5.0 and at a temperature of 20° C., to simultaneously neutralize the titanium tetrachloride, thereby an aqueous slurry of hydrous titanium oxide having a concentration of 14 g/L in terms of TiO$_2$ was obtained.

The aqueous slurry was filtered and then washed with water to remove sodium ions and chloride ions therefrom. Pure water was added to the obtained cake to provide an aqueous slurry of amorphous hydrous titanium oxide having a concentration of 110 g/L in terms of TiO$_2$.

959 g of barium hydroxide octahydrate (manufactured by Sakai Chemical Industry Co., Ltd.) was added to the aqueous slurry of the hydrous titanium oxide obtained above at normal temperature so that the resulting mixture had a Ba/Ti molar ratio of 2.3, and then 567 mL of pure water, thereby a slurry of mixture of hydrous titanium oxide and barium hydroxide.

The slurry of the mixture of hydrous titanium oxide and barium hydroxide was placed in an autoclave vessel, and then subjected to hydrothermal treatment at 200° C. for 2 hours without passing through the barium titanate precursor. Thereafter, the content in the autoclave was allowed to cool to room temperature. The obtained aqueous slurry was filtered, washed with water, and then dried at 130° C. to provide barium titanate powder.

Comparative Example 2

Barium titanate powder was obtained in the same manner as in Example 1 except that the simultaneous neutralization of titanium tetrachloride was performed at a pH of 3.0 and at a temperature of 30° C. to provide an aqueous slurry of amorphous hydrous titanium oxide, the reaction of the aqueous slurry of the amorphous hydrous titanium oxide with barium hydroxide was performed at a temperature of 100° C. for 5 hours, and the hydrothermal treatment of aqueous slurry of barium titanate precursor thus obtained was performed at 200° C. for 2 hours, and otherwise in the same manner as in Example 1.

Comparative Example 3

Barium titanate powder was obtained in the same manner as in Example 1 except that the simultaneous neutralization of titanium tetrachloride was performed at a pH of 3.0 and at a temperature of 60° C. to provide an aqueous slurry of anatase hydrous titanium oxide, the reaction of the aqueous slurry of the hydrous titanium oxide with barium hydroxide was performed at a temperature of 70° C. for 5 hours, and the hydrothermal treatment of aqueous slurry of barium titanate precursor thus obtained was performed at 200° C. for 2 hours, and otherwise in the same manner as in Example 1.

The thermal contraction behavior of the barium titanate powder thus obtained was examined in the same manner as the barium titanate powder obtained in Example 6. The results are shown in FIG. 1.

Comparative Example 4

Barium titanate powder was obtained in the same manner as in Example 1 except that the simultaneous neutralization of titanium tetrachloride was performed at a pH of 1.0, the reaction of the hydrous titanium oxide with barium hydroxide was performed at a temperature of 100° C. for 5 hours, and the hydrothermal treatment of aqueous slurry of barium titanate precursor was performed at 200° C. for 2 hours, and otherwise in the same manner as in Example 1.

Comparative Example 5

Barium titanate powder was obtained in the same manner as in Example 1 except that the simultaneous neutralization of titanium tetrachloride was performed at a temperature of 80° C., and the hydrothermal treatment of aqueous slurry of barium titanate precursor was performed at 200° C. for 24 hours, and otherwise in the same manner as in Example 1.

Comparative Example 6

Barium titanate powder was obtained in the same manner as in Example 1 except that the simultaneous neutralization of titanium tetrachloride was performed at a pH of 1.5 at a temperature of 20° C., and the hydrothermal treatment of aqueous slurry of barium titanate precursor was performed at 180° C. for 20 hours, and otherwise in the same manner as in Example 1.

Comparative Example 7

Barium titanate powder was obtained in the same manner as in Example 1 except that the simultaneous neutralization of titanium tetrachloride was performed at a pH of 4.0 and at a temperature of 40° C., and the hydrothermal treatment of aqueous slurry of barium titanate precursor was performed at 200° C. for 2 hours, and otherwise in the same manner as in Example 1.

Comparative Example 8

Barium titanate powder was obtained in the same manner as in Example 1 except that the simultaneous neutralization of titanium tetrachloride was performed at a pH of 4.0 and at a temperature of 40° C., and the hydrothermal treatment of aqueous slurry of barium titanate precursor was performed at 180° C. for 20 hours, and otherwise in the same manner as in Example 1.

The reaction conditions in the above-mentioned Examples 1-10 and Comparative Examples 2-8, i.e., the pH and temperatures at which titanium tetrachloride was simultaneously neutralized with sodium hydroxide, the reaction temperature at which and the reaction time for which the hydrous titanium oxide was reacted with barium hydroxide to provide the barium titanate precursor, and the temperature at which and the time for which the aqueous slurry of barium titanate precursor was hydrothermally treated are shown in Table 1.

As to the reaction conditions in Comparative Example 1, the pH and temperatures at which titanium tetrachloride was simultaneously neutralized with sodium hydroxide, and the temperature at which and the time for which a mixture of hydrous titanium oxide and barium hydroxide was hydrothermally treated are shown in Table 1.

Further, the properties of the hydrous titanium oxide used in Examples 1-10 and Comparative Examples 1-8, and the properties of the barium titanate powder obtained in Examples 1-10 and Comparative Examples 1-8 are shown in Table 2.

(Crystal Structure of Hydrous Titanium Oxide)

A small amount was withdrawn from the aqueous slurry of hydrous titanium oxide obtained by simultaneously neutralizing titanium tetrachloride with sodium hydroxide, and filtered and washed with water, and dried to provide powder. The crystal structure of the powder was examined using a powder X-ray diffraction apparatus (RINT-TTR III, manufactured by Rigaku Corporation, Radiation source: CuKα).

Further, the half width was calculated from the peak of (101) plane and was used as the index of the crystallinity of the hydrous titanium oxide. As shown in Table 2, the peak of the hydrous titanium oxide in each of Comparative Examples 1, 2, 6, 7, and 8 was found to be very broad, and thus the hydrous titanium oxides obtained therein were judged to be amorphous.

(Crystallite Size of Barium Titanate)

The barium titanate powder was subjected to powder X-ray diffraction using a powder X-ray diffraction apparatus (RINT-TTR III, manufactured by Rigaku Corporation, Radiation source: CuKα), and then the crystallite size of the barium titanate was calculated using the integration width of (111) plane by the Scherrer method.

(Specific Surface Area and Particle Diameter of Hydrous Titanium Oxide Powder and Barium Titanate Powder)

The specific surface area of each of the hydrous titanium oxide powder and the barium titanate powder was measured by a single point BET method using a fully automatic specific surface area meter (HM Model-1220, manufactured by Mountech Co., Ltd.), after degassing at 205° C. for 30 minutes.

The particle diameter was calculated from the specific surface area of the barium titanate obtained above based on a conversion formula (Particle diameter=6/(Density×Specific surface area)) where the density of the barium titanate was 6.0 g/cm$^3$.

TABLE 1

|  | Preparation of Hydrous Titanium Oxide | | Preparation of Barium Titanate Precursor | | Hydrothermal Treatment | |
| --- | --- | --- | --- | --- | --- | --- |
|  | pH | Temperature (° C.) | Temperature (° C.) | Time (h) | Temperature (° C.) | Time (h) |
| Example 1 | 2.0 | 60 | 100 | 2.0 | 190 | 0.5 |
| Example 2 | 2.0 | 50 | 100 | 2.0 | 180 | 20.0 |
| Example 3 | 2.0 | 50 | 100 | 2.0 | 205 | 2.0 |
| Example 4 | 3.0 | 60 | 100 | 5.0 | 130 | 0.5 |
| Example 5 | 2.0 | 50 | 80 | 5.0 | 200 | 2.0 |
| Example 6 | 3.0 | 60 | 95 | 5.0 | 180 | 0.5 |
| Example 7 | 2.0 | 50 | 100 | 2.0 | 110 | 2.0 |
| Example 8 | 2.0 | 45 | 100 | 2.0 | 200 | 2.0 |
| Example 9 | 2.0 | 45 | 100 | 2.0 | 180 | 20.0 |
| Example 10 | 3.5 | 45 | 100 | 2.0 | 200 | 2.0 |
| Comparative 1 | 5.0 | 20 | — | — | 200 | 2.0 |
| Comparative 2 | 3.0 | 30 | 100 | 5.0 | 200 | 2.0 |
| Comparative 3 | 3.0 | 60 | 70 | 5.0 | 200 | 2.0 |
| Comparative 4 | 1.0 | 60 | 100 | 5.0 | 200 | 2.0 |

TABLE 1-continued

|  | Preparation of Hydrous Titanium Oxide | | Preparation of Barium Titanate Precursor | | Hydrothermal Treatment | |
| --- | --- | --- | --- | --- | --- | --- |
|  | pH | Temperature (° C.) | Temperature (° C.) | Time (h) | Temperature (° C.) | Time (h) |
| Comparative 5 | 2.0 | 80 | 100 | 2.0 | 200 | 24.0 |
| Comparative 6 | 1.5 | 20 | 100 | 2.0 | 180 | 20.0 |
| Comparative 7 | 4.0 | 40 | 100 | 2.0 | 200 | 2.0 |
| Comparative 8 | 4.0 | 40 | 100 | 2.0 | 180 | 20.0 |

TABLE 2

|  | Hydrous Titanium Oxide | | | Barium Titanate | | | |
| --- | --- | --- | --- | --- | --- | --- | --- |
|  | Specific Surface Area ($m^2/g$) | Crystal Structure*) | Half Width (°) | Specific Surface Area ($m^2/g$) | Particle Diameter (Å) | Crystallite Size (Å) | Crystallite Size/ Particle Diameter |
| Example 1 | 270 | A | 2.5 | 20.6 | 485 | 497 | 1.02 |
| Example 2 | 256 | A | 2.5 | 11.8 | 847 | 883 | 1.04 |
| Example 3 | 256 | A | 2.5 | 17.1 | 585 | 581 | 0.99 |
| Example 4 | 226 | A | 2.4 | 48.3 | 207 | 221 | 1.07 |
| Example 5 | 256 | A | 2.5 | 21.7 | 461 | 429 | 0.93 |
| Example 6 | 226 | A | 2.4 | 25.2 | 397 | 406 | 1.02 |
| Example 7 | 256 | A | 2.5 | 68.4 | 146 | 149 | 1.02 |
| Example 8 | 284 | A | 2.9 | 21.8 | 459 | 460 | 1.00 |
| Example 9 | 284 | A | 2.9 | 13.7 | 730 | 768 | 1.05 |
| Example 10 | 322 | A | 3.1 | 20.2 | 495 | 484 | 0.98 |
| Comparative 1 | 409 | Am | 6.3 | 12.6 | 794 | 426 | 0.54 |
| Comparative 2 | 414 | Am | 7.5 | 20.5 | 488 | 430 | 0.88 |
| Comparative 3 | 226 | A | 2.4 | 25.6 | 391 | 337 | 0.86 |
| Comparative 4 | 222 | A | 2.2 | 15.0 | 667 | 404 | 0.61 |
| Comparative 5 | 158 | A | 1.6 | 10.2 | 980 | 870 | 0.89 |
| Comparative 6 | 401 | Am | 5.5 | 12.7 | 787 | 569 | 0.72 |
| Comparative 7 | 422 | Am | 6.5 | 18.6 | 538 | 447 | 0.83 |
| Comparative 8 | 422 | Am | 6.5 | 11.9 | 840 | 714 | 0.85 |

*)"A" represents "anatase", and "Am" represents "amorphous".

As shown in Table 2, the barium titanate powder obtained by the method of the invention has a specific surface area in the range of 10 to 70 $m^2/g$ and a single crystallinity expressed by crystallite size/particle diameter in the range of 0.90 to 1.10, preferably in the range of 0.93 to 1.07. Thus, the barium titanate powder obtained by the method of the invention was proved to be comprised of fine particles superior in crystallinity.

Further, as the thermal contraction behavior of the barium titanate powder obtained according to the method of the invention is shown in FIG. 1, the barium titanate powder was found to start thermal contraction at a higher temperature, as compared with the conventional barium titanate powders, showing that the barium titanate powder obtained by the method of the invention has an improved thermal contraction characteristics.

The invention claimed is:

1. A method for producing barium titanate powder comprising the steps of:
    adding an aqueous slurry of anatase hydrous titanium oxide having a BET specific surface area in the range of 200 to 400 $m^2/g$ and a half width of diffraction peak of (101) plane in the range of 2.3° to 5.0° as measured by X-ray diffraction to an aqueous solution of barium hydroxide while maintaining the aqueous solution of barium hydroxide at a temperature in the range from 80° C. to the boiling point thereof under normal pressure to cause a reaction of the barium hydroxide with the hydrous titanium oxide to provide an aqueous slurry of barium titanate precursor; and
    subjecting the barium titanate precursor thus obtained to hydrothermal treatment over a period of time shorter than 24 hours to provide barium titanate particles.

2. The method according to claim 1, wherein in the step of subjecting the barium titanate precursor to hydrothermal treatment to provide barium titanate, the hydrothermal treatment is performed at a temperature of 250° C. or less.

3. The method according to claim 1 comprising the steps of:
    adding an aqueous solution of titanium tetrachloride and an aqueous solution of an alkali to water maintained at a temperature of 45 to 65° C. at the same time while maintaining the temperature of the resulting reaction mixture in the range of 45 to 65° C. and maintaining the pH thereof in the range of 1.5 to 3.5 to simultaneously neutralize the titanium tetrachloride with the alkali thereby to provide an aqueous slurry of anatase hydrous titanium oxide having a BET specific surface area in the range of 200 to 400 $m^2/g$ and a half width of diffraction peak of (101) plane in the range of 2.3° to 5.0° as measured by X-ray diffraction;
    adding the aqueous slurry of anatase hydrous titanium oxide to an aqueous solution of barium hydroxide while maintaining the aqueous solution of barium hydroxide solution at a temperature in the range from 80° C. to the boiling point thereof under normal pressure to cause a reaction of the barium hydroxide with the hydrous titanium oxide to provide an aqueous slurry of barium titanate precursor; and subjecting the barium titanate precursor thus obtained to hydrothermal treatment over a period of time shorter than 24 hours to provide barium titanate particles.

4. The method according to claim 3, wherein in the step of subjecting the barium titanate precursor to hydrothermal treatment to obtain barium titanate, the hydrothermal treatment is performed at a temperature of 250° C. or less.

* * * * *